3,441,564
Patented Apr. 29, 1969

1

3,441,564
NOVEL BENZOXAZINES, BENZOXAZEPINES
AND BENZOXAZOCINES
John Krapcho, Somerset, N.J., assignor to E. R. Squibb &
Sons, Inc., New York, N.Y., a corporation of Delaware
No Drawing. Original application Aug. 1, 1966, Ser. No.
569,020, now Patent No. 3,401,166. Divided and this
application Jan. 29, 1968, Ser. No. 701,088
Int. Cl. C07d 87/54, 87/38; A61k 27/00
U.S. Cl. 260—244                                4 Claims

ABSTRACT OF THE DISCLOSURE

Compounds of the formula

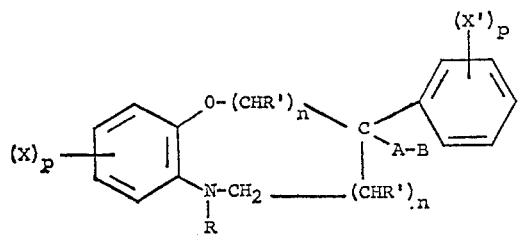

wherein R is lower alkyl, lower alkenyl, aralkyl or aralkenyl; R' is hydrogen or lower alkyl; X and X' are the same or different and are hydrogen, lower alkyl, lower alkoxy, amino, dialkylamino, halo, lower alkylthio, hydroxy, cyano, nitro or trifluoromethyl; A is lower alkylene; B is a basic nitrogen containing radical having less than twelve carbon atoms; $p$ is an integer from one to three and $n$ is zero or one, and salts thereof are prepared. These new compounds are useful as tranquilizers, inter alia.

This application is a division of my application Ser. No. 569,020, filed Aug. 1, 1966, now U.S. Patent 3,401,166.

The therapeutically active compounds of this invention are of the general formula

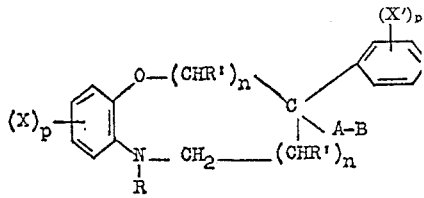

wherein; R is selected from the group consisting of lower alkyl, lower alkenyl, aralkyl or aralkenyl; $R^1$ is selected from the group consisting of hydrogen and lower alkyl; X and X' may be the same or different and are selected from the group consisting of hydrogen, lower alkyl, lower alkoxy, amino, dialkylamino, halo, lower alkylthio (e.g., $CH_3CH_2CH_2S$—), hydroxy, cyano, nitro and trifluoromethyl; A represents lower alkylene; B is a basic nitrogen containing radical having less than twelve carbons; $p$ is an integer from one to three and $n$ represents 0 or 1, and to salts thereof.

Among the suitable radicals represented by the symbol B are: amino; (lower alkyl)amino; di(lower alkyl) amino; (hydroxylower alkyl)amino; di(hydroxylower alkyl)amino; phenyl(lower alkyl)amino; N-(lower alkyl) phenyl (lower alkyl)amino; and saturated 5- to 7-membered monocyclic heterocyclic radicals of less than twelve carbon atoms, as exemplified by piperidino; (lower alkyl) piperidino; di(lower alkyl)piperidino; (lower alkoxy) piperidino; homopiperidino; 2,3- or 4-piperidyl;

2

2,3- or 4-(N-lower alkylpiperidyl); pyrrolidino; (lower alkyl)pyrrolidino; di(lower alkyl)pyrrolidino; (lower alkoxy)pyrrolidino; 2- or 3-pyrrolidino; 2- or 3-(N-lower alkyl pyrrolidyl); morpholino; (lower alkyl)morpholino; di(lower alkyl)morpholino; (lower alkoxy)morpholino; thiamorpholino; (lower alkyl)thiamorpholino; di(lower alkyl)thiamorpholino; (lower alkoxy)thiamorpholino; piperazino; 4-R-substituted piperazino (e.g., $N^4$-ethylpiperazino; $N^4$-phenylpiperazino, and so forth); [hydroxy (lower alkyl)]piperazino [e.g., $N^4$-(2-hydroxyethyl) piperazino]; (lower alkyl)piperazino (e.g., $N^4$-methylpiperazino); di(lower alkyl)piperazino; (lower alkoxy) piperazino; homopiperazino; and 4-R-substituted homopiperazino (e.g., $N^4$-benzylhomopiperazino).

The terms "lower alkyl," "lower alkoxy," and "lower alkylene," as employed herein, include both straight and branched chain radicals of less than eight carbon atoms, for example, methyl, ethyl, propyl, isopropyl, butyl, isobutyl, t-butyl, amyl, methoxy, ethoxy, propoxy, isopropoxy, ethylene, propylene, and the like.

The term "aryl" as employed herein includes mononuclear and dinuclear radicals such as X-substituted phenyl (including 3,4-methylenedioxyphenyl and 3,4-ethylenedioxyphenyl), furyl, thienyl, naphthyl or pyridyl.

The particularly preferred compounds are those wherein X and X' are hydrogen, R is lower alkyl, R' is hydrogen, A is ethylene, B is dimethylamino and both $n$'s are 0.

As to the salts, those coming within the purview of this invention include the acid-addition salts of those compounds containing a basic group particularly the non-toxic acid-addition salts and the quaternary ammonium salts. Acids useful for preparing these acid-addition salts include, inter alia, inorganic acids, such as the hydrohalic acids (e.g., hydrochloric and hydrobromic acid), sulfuric acid, nitric acid, and phosphoric acid, and organic acids such as maleic, tartaric, citric, acetic, salicyclic, succinic acid, theophylline, 8-chloro-theophylline, maleic, benzoic, nicotinic, methanesulfonic or cyclohexanesulfamic. The quaternary ammonium salts include those formed with alkyl halides (e.g., methyl chloride, isobutyl bromide, dodecyl chloride and cetyl iodide), benzyl halides (e.g., benzyl chloride) and dilower alkyl sulfates (e.g., dimethyl sulfate).

Compounds of this invention and the salts thereof possess central nervous system modifying activity, particularly as depressants and are therefore useful as tranquilizers. They may be administered orally or parenterally in the form of tablets, capsules, elixirs, injectables, or the like, by incorporating the appropriate dosage of the compound of Formula I or a physiologically acceptable salt thereof in a dosage range similar to that used with chlordiazepoxide. The compounds of this invention also have been found to possess antibacterial activity.

The oxa compounds coming within the purview of this invention are prepared by reacting a 2-monolower alkyl-aminophenol having the Formula II

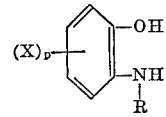
II wherein R, X and $p$ are as hereinabove defined with an acid halide having the Formula III

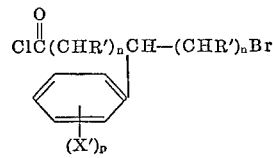
III wherein R', X' and p are as defined above to yield an intermediate of Formula IV

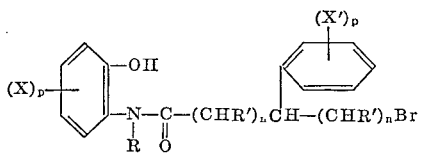

This intermediate is then cyclized as by treatment with an alkali metal hydroxide such as sodium hydroxide to form compound of Formula V

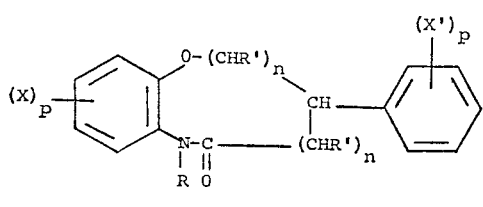

This compound of Formula V is then reacted in an inert solvent, such as toluene, in the presence of a base such as sodamide, potassium butoxide, powdered sodium hydroxide, and the like, with a basic halide of the formula

Hal—A—B wherein Hal is halogen, e.g., chloro or bromo and A and B are as defined above, to yield the new intermediates of this invention having the Formula VI

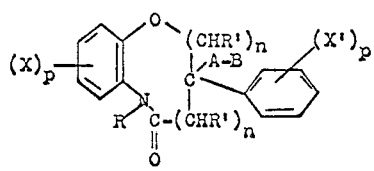

wherein R, R', A, B, X, X', p and n are as defined above.

The final products of this invention (compounds of Formlua I) are then prepared by reducing the new intermediates of this invention with a reducing agent such as lithium aluminum hydride.

Examples of 2-monoloweralkyl aminophenol starting materials are:

o-methylaminophenol;
o-t-butylaminophenol;
o-heptylaminophenol;
2-ethylamino-4-ethoxyphenol;
3,4-dichloro-2-ethylaminophenol;
4-methylthio-2-propylaminophenol;
6-trifluoromethyl-2-propylaminophenol;
6-trifluoromethyl-2-methylaminophenol;
5-hydroxy-2-methylaminophenol;
4-dimethylamino-2-methylaminophenol;
3,4-dimethoxy-2-methylaminophenol;
4-cyano-2-methylaminophenol; and
6-nitro-2-methylaminophenol.

Examples of compounds which may be utilized as starting materials according to Formula III are:

α-bromo-α-phenyl-acetyl chloride;
α-bromo-α-(2-methylphenyl)-propionoyl chloride;
γ-bromo-β-phenyl butyroyl chloride;
β-bromo-β-phenylpropionyl chloride;
β-bromo-α-heptyl-β-phenylpropionyl chloride;
β-bromo-α-phenyl-propionyl chloride;
γ-bromo-β-phenyl butyroyl chloride;
γ-bromo-β-phenylvaleroyl chloride;
β-bromo-α-methyl-β-(4-methoxyphenyl)propionyl chloride;
α-bromo-α-(3-aminophenyl)acetyl chloride;
α-bromo-α-(3-chlorophenyl)acetyl chloride;
α-bromo-α-(3-ethylthiophenyl)acetyl chloride;
α-bromo-α-(2-hydroxyphenyl)acetyl chloride;
α-bromo-α-(6-trifluoromethyl)acetyl chloride;
α-bromo-α-(4-nitrophenyl)acetyl chloride; and
α-bromo-α-(2,4,6-trichlorophenyl)acetyl chloride.

The following examples are illustrative of the invention. All temperatures are stated in degrees centigrade unless otherwise stated:

EXAMPLE 1

2-(2-diethylaminoethyl)-3,4-dihydro-4-methyl-2-phenyl-2H-1,4-benzoxazine, hydrochloride (A) Preparation of 4-methyl-2-phenyl-2H-1,4-benzoxazine-3-(4H)-one. A stirred solution of 51.0 g. of α-bromo-α-phenyl-acetyl chloride in 250 ml. of chloroform is cooled to 10° and treated dropwise with a solution of 27.0 g. of o-methylaminophenol and 22 g. of triethylamine in 100 ml. of chloroform while maintaining the temperature at 10–20°. This mixture is allowed to stand at room temperature overnight and then washed with 100 ml. of water (six times). The organic phase is dried over magnesium sulfate, filtered and the solvent evaporated to give 64 g. of residue. The latter is dissolved in 80 ml. of ethanol and added to a solution of 16 g. of sodium hydroxide in 400 ml. of water at 40°. The mixture is then heated at 80–83° for twenty minutes. A heavy oil separates from the mixture. The latter is cooled and the oily phase solidifies. This solid is dissolved in 500 ml. of ether, washed with 50 ml. of water several times and then dried over magnesium sulfate. After evaporation of the solvent, the residual material weighs 31.5 g., M.P. 75–77°. Crystallization from 100 ml. of isopropyl alcohol yields 26 g. of material, M.P. 76–78°.

(B) Preparation of 2-(2-diethylaminoethyl)-4-methyl-2-phenyl-2H-1,4-benzoxazine-3(4H)-one. To a suspension of 2.7 g. of 50% sodium hydride in 130 ml. of dimethylformamide is added 13.0 g. of material from part A. This mixture is heated to 80°, maintained at 80–85° for thirty minutes, cooled and treated with a solution of 11.0 g. of 2-diethylaminoethyl chloride in 40 ml. of toluene. The mixture is stirred at room temperature for one hour and then at 95–100° for four hours. The solvent is removed at reduced pressure and the residue is treated with 100 ml. of water and 100 ml. of ether. The ether phase is extracted with dilute hydrochloric acid and the latter solution then treated with sodium hydroxide solution to liberate the base. The free base is extracted with ether, dried over magnesium sulfate, filtered, and the filtrate evaporated. Distillate of the residue gives 6.0 g. of product, B.P. 190–195° (0.5 mm.). The citrate salt of this material melts at 106–108° (from acetonitrile).

(C) Preparation of 2 - (2 - diethylaminoethyl) - 3,4-dihydro - 4 - methyl - 2-phenyl-2H-1,4-benzoxazine, hydrochloride. By interaction of an ether solution of the material from part B with a suspension of 1.0 g. of lithium aluminum hydride in ether according to the procedure described in Example 1, the product is obtained.

EXAMPLE 2

3-[2-(pyrrolidyl)ethyl]-3,4,5,6-tetrahydro-6-methyl-3-(3-chlorophenyl)-2H-1,6-benzoxazocine, hydrochloride Following the procedure of Example 1 but substituting γ - bromo - β - (3-chlorophenyl)butynoyl chloride for α-bromo-α-phenylacetyl chloride in part A thereof and 2-pyrrolidylethylchloride for 2-diethylaminoethyl in part B thereof the desired product is obtained.

EXAMPLE 3

1-[2(morpholinyl)ethyl]-2,3,4-trihydro-5-methyl-2-phenyl-1,5-benzoxazepine, hydrochloride Following the procedure of Example 2 but substituting β - bromo - β - phenylpropionyl chloride for α-bromo-α-phenylacetyl chloride in part A thereof and 2-(morpholinyl)ethyl chloride for 2-diethylaminoethyl in part B thereof the desired product is obtained.

EXAMPLE 4

3-[2(piperidino)ethyl]-2,3,4-trihydro-5-methyl-3-phenyl-1,5-benzoxazepine, hydrochloride Following the procedure of Example 1 but substituting β-bromo-α-phenylpropionyl chloride for α-bromo-α-phenylacetyl chloride in part A thereof and 2-piperidinoethyl for 2-diethylaminoethyl in part B thereof the desired product is obtained.

The invention may be variously otherwise embodied within the scope of the appended claims.

What is claimed is:

1. A compound of the formula:

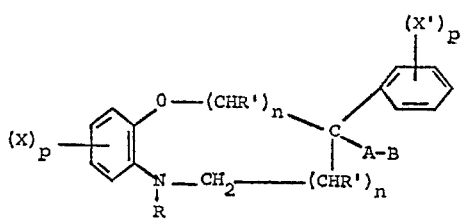

R' is hydrogen or lower alkyl; X and X' are the same or different and are selected from the group consisting of hydrogen, lower alkyl, lower alkoxy, amino, di(lower alkyl)amino, halo, lower alkylthio, hydroxy, cyano, nitro and trifluoromethyl; A represents lower alkylene; B is a basic nitrogen containing radical having less than twelve carbons selected from the group consisting of amino, (lower alkyl)amino, di(lower alkyl)amino, (hydroxy lower alkyl)amino, di(hydroxy lower alkyl)amino, phenyl (lower alkyl)amino, N-(lower alkyl)phenyl(loweralkyl) amino, and saturated 5- to 7-membered monocyclic heterocyclic radicals of less than twelve carbon atoms selected from the group consisting of piperidino, (lower alkyl)piperidino, di(lower alkyl)piperidino, (lower alkoxy)piperidino, homopiperidino, piperidyl, (N-lower alkylpiperidyl), pyrrolidino, (lower alkyl)pyrrolidino, di(lower alkyl)pyrrolidino, (lower alkoxy)pyrrolidino, pyrrolidyl, (N-lower alkylpyrrolidyl), morpholino, (lower alkyl)morpholino, di(lower alkyl)morpholino, (lower alkoxy)morpholino, thiamorpholino, (lower alkyl)thiamorpholino, di(lower alkyl)thiamorpholino, (lower alkoxy) thiamorpholino, piperazino, 4-R-substituted piperazino, [hydroxy (lower alkyl)]piperazino, (lower alkyl) piperazino, di(lower alkyl)piperazino, (lower alkoxy) piperazino, homopiperazino, and 4-R-substituted homopiperazino; $p$ is an integer from one to three and $n$ represents zero or one; and salts thereof.

2. A compound of the formula:

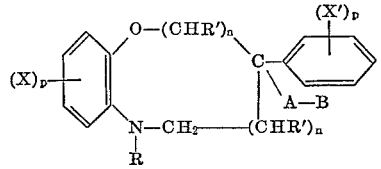

wherein R is lower alkyl; R' is hydrogen or lower alkyl; X and X' are the same or different and are hydrogen or halogen; A is lower alkylene; B is di(lower alkyl)amino, pyrrolidino, piperidino, or morpholino; $p$ is an integer from one to three, and $n$ represents zero or one; and salts thereof.

3. A compound of the formula:

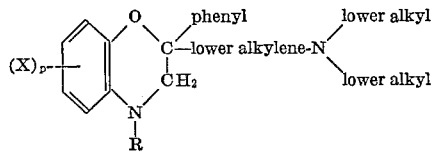

wherein R, X and $p$ are as defined in claim 2.

4. A compound in accordance with claim 2 having the name 2-(2-diethylaminoethyl)-3,4-dihydro-4-methyl-2-phenyl-2H-1,4-benzoxazine, hydrochloride.

References Cited

UNITED STATES PATENTS 3,089,872   5/1963   Krapcho _____ 260—239.3

HENRY R. JILES, *Primary Examiner.*

R. T. BOND, *Assistant Examiner.*

U.S. Cl. X.R.

260—243, 247.5, 268, 293.4, 294.7, 326.5, 326.81. 333; 424—244, 248

PO-1050
(5/69)

UNITED STATES PATENT OFFICE
CERTIFICATE OF CORRECTION

Patent No. 3,441,564      Dated April 29, 1969

Inventor(s) John Krapcho

It is certified that error appears in the above-identified patent and that said Letters Patent are hereby corrected as shown below:

Column 4, line 68, "1" should read -- 2 --; line 71, "2" should read -- 1 --. Column 5, line 24, after the formula insert the following: -- wherein R is lower alkyl, --.

SIGNED AND
SEALED

DEC 9 - 1969

(SEAL)
Attest:

Edward M. Fletcher, Jr.
Attesting Officer

WILLIAM E. SCHUYLER, JR.
Commissioner of Patents